United States Patent
Alriksson et al.

(10) Patent No.: US 10,694,410 B2
(45) Date of Patent: Jun. 23, 2020

(54) RADIO LINK MONITORING IN LISTEN-BEFORE-TALK COMMUNICATIONS

(71) Applicant: Telefonaktiebolaget LM Ericsson (publ), Stockholm (SE)

(72) Inventors: Peter Alriksson, Hörby (SE); Mai-Anh Phan, Herzogenrath (DE); David Sugirtharaj, Lund (SE); Emma Wittenmark, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/078,678

(22) PCT Filed: Feb. 22, 2017

(86) PCT No.: PCT/EP2017/054019
§ 371 (c)(1),
(2) Date: Aug. 22, 2018

(87) PCT Pub. No.: WO2017/144514
PCT Pub. Date: Aug. 31, 2017

(65) Prior Publication Data
US 2019/0053082 A1    Feb. 14, 2019

Related U.S. Application Data

(60) Provisional application No. 62/298,560, filed on Feb. 23, 2016.

(51) Int. Cl.
*H04W 24/08* (2009.01)
*H04W 76/19* (2018.01)
(Continued)

(52) U.S. Cl.
CPC .......... *H04W 24/08* (2013.01); *H04W 48/08* (2013.01); *H04W 76/19* (2018.02); *H04B 17/309* (2015.01); *H04W 48/16* (2013.01); *H04W 56/00* (2013.01)

(58) Field of Classification Search
CPC ..... H04W 24/08; H04W 56/00; H04W 48/08; H04W 48/16; H04W 76/19; H04B 17/309
See application file for complete search history.

(56) References Cited

U.S. PATENT DOCUMENTS

2013/0182583 A1* 7/2013 Siomina ................ H04W 24/10
370/252
2015/0327097 A1   11/2015 Chai et al.
(Continued)

FOREIGN PATENT DOCUMENTS

| WO | 2015191963 A1 | 12/2015 |
| WO | 2016148530 A1 | 9/2016 |
| WO | 2016180451 A1 | 11/2016 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.2.0, Dec. 2015, 1-290.
3GPP, "3rd Generation Partnership Project; Technical Specification Group Radio Access Network; Evolved Universal Terrestrial Radio Access (E-UTRA); Physical channels and modulation (Release 13)", 3GPP TS36.211 V13.0.0, Dec. 2015, 1-141.

(Continued)

*Primary Examiner* — Dady Chery
(74) *Attorney, Agent, or Firm* — Murphy, Bilak & Homiller, PLLC

(57) ABSTRACT

In one aspect, a wireless device monitors radio link quality for a link between the wireless device and a wireless (Continued)

transmitter that is configured to transmit a discovery signal at spaced, periodic, intervals and that is further configured to intermittently transmit subframes carrying user data, such that the wireless device is unable to predict which subframes will carry user data before attempting to detect the subframes. The wireless device collects, for each of the spaced, periodic, intervals, discovery-signal signal quality metrics corresponding to the discovery signal. The wireless device also collects, for each detected subframe carrying user data, detected-subframe signal quality metrics corresponding to the detected subframe. The wireless device generates, for each of a plurality of evaluation intervals, an in-synch or out-of-synch indication, based on a combination of the discovery-signal signal quality metrics corresponding to the evaluation interval and the detected-subframe signal quality metrics corresponding to the evaluation interval.

15 Claims, 8 Drawing Sheets

(51) Int. Cl.
*H04W 48/08* (2009.01)
*H04W 56/00* (2009.01)
*H04W 48/16* (2009.01)
*H04B 17/309* (2015.01)

(56) References Cited

U.S. PATENT DOCUMENTS

| | | |
|---|---|---|
| 2016/0127098 A1 | 5/2016 | Ng et al. |
| 2016/0227425 A1 | 8/2016 | Kim et al. |
| 2016/0227602 A1 | 8/2016 | Yi et al. |
| 2016/0338118 A1* | 11/2016 | Vajapeyam .......... H04B 17/318 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 14)", 3GPP TS36.213 V14.0.0, Sep. 2016, 1-406.

3GPP, "3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.0.0 (Dec. 2015), Dec. 2015, 1-507.

3GPP, "3rd Generation Partnership Project; Technical Specification Group Radio Access Network; Evolved Universal Terrestrial Radio Access (E-UTRA); Requirements for support of radio resource management (Release 10)", 3GPP TS 36.133 V10.12.0, Sep. 2013, 1-714.

3GPP, "3rd Generation Partnership Project; Technical Specification Group Radio Access Network; Evolved Universal Terrestrial Radio Access (E-UTRA); User Equipment (UE) procedures in idle mode (Release 13)", 3GPP TS 36.304 V13.0.0, Dec. 2015, 1-42.

* cited by examiner

RADIO LINK MONITORING IN LISTEN-BEFORE-TALK COMMUNICATIONS

TECHNICAL FIELD

The present disclosure is generally related to wireless communications networks, and is more particularly related to monitoring a radio link quality for determining whether a radio link has failed.

BACKGROUND

The 3rd Generation Partnership Project (3GPP) is responsible for the standardization of the Universal Mobile Telecommunication System (UMTS) and the fourth-generation wireless system commonly known as Long Term Evolution (LTE). The 3GPP work on LTE is also referred to as Evolved Universal Terrestrial Access Network (E-UTRAN). LTE is a technology for realizing high-speed packet-based communication that can reach high data rates both in the downlink (the link carrying transmissions from the base station to a mobile station) and in the uplink (the link carrying transmissions from a mobile station to the base station). To support high data rates, LTE allows for a system bandwidth of 20 MHz, or up to 100 MHz when carrier aggregation is employed. LTE is also able to operate in different frequency bands and can operate in at least Frequency Division Duplex (FDD) and Time Division Duplex (TDD) modes.

In LTE, transmissions from base stations (eNBs) are sent to mobile stations (referred to as user equipment, or UEs) using orthogonal frequency division multiplexing (OFDM). OFDM splits the signal into multiple parallel sub-carriers in frequency. LTE uses OFDM in the downlink and Discrete Fourier Transform (DFT)-spread OFDM (also referred to as single-carrier Frequency Division Multiple Access, or SC-FDMA) in the uplink. The basic LTE downlink physical resource can thus be seen as a time-frequency grid, where each resource element corresponds to one OFDM subcarrier in frequency during one OFDM symbol time interval. The uplink subframe has the same subcarrier spacing as the downlink and the same number of SC-FDMA symbols in the time domain as OFDM symbols in the downlink. The basic unit of transmission in LTE is a resource block (RB), which in its most common configuration consists of 12 subcarriers in the frequency domain and 7 OFDM symbols (one slot, or 0.5 ms). A pair of two adjacent resource blocks in time direction (1.0 ms) is known as a resource block pair. Resource blocks are numbered in the frequency domain, starting with 0 from one end of the system bandwidth. A unit of one subcarrier and 1 OFDM symbol is referred to as a resource element (RE). Thus, an RB consists of 84 REs.

An LTE radio subframe is composed of two slots in time and multiple resource blocks in frequency with the number of RBs determining the bandwidth of the system. Furthermore, the two RBs in a subframe that are adjacent in time are denoted as an RB pair. Currently, LTE supports standard bandwidth sizes of 6, 15, 25, 50, 75 and 100 RB pairs.

In the time domain, LTE downlink transmissions are organized into radio frames of 10 milliseconds in length, each radio frame consisting of ten equally-sized subframes of length Tsubframe=1 ms. For normal cyclic prefix, one subframe consists of 14 OFDM symbols. The duration of each symbol is approximately 71.4 µs.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information.

The signal transmitted by an eNB in a downlink subframe may be transmitted from multiple antennas and the signal may be received at UE that has multiple antennas. In order to demodulate any transmissions on the downlink, a UE thus relies on reference symbols (RS) that are transmitted on the downlink. These reference symbols and their positions in the time-frequency grid are known to the UE and can be used to determine channel estimates by measuring the effect of the radio channel on these symbols. As of Release 11 (Rel-11) of the 3GPP specifications for LTE, there are multiple types of reference symbols. One important type is the common reference symbols (CRS), which are used for channel estimation during demodulation of control and data messages. The CRSs are also used by the UE for synchronization, i.e., to align its timing with the downlink signal as received from the eNB. The CRSs occur once every subframe.

From 3GPP LTE Release 11 (Rel-11) onwards, above described resource assignments can also be scheduled on the enhanced Physical Downlink Control Channel (ePDCCH). For Rel-8 to Rel-10 only Physical Downlink Control Channel (PDCCH) is available. The PDCCH/ePDCCH is used to carry downlink control information (DCI) such as scheduling decisions and power-control commands More specifically, the DCI includes:

Downlink scheduling assignments, including Physical Downlink Shared Channel (PDSCH) resource indication, transport format, hybrid-ARQ information, and control information related to spatial multiplexing (if applicable). A downlink scheduling assignment also includes a command for power control of the Physical Uplink Control Channel (PUCCH) used for transmission of hybrid-ARQ acknowledgements in response to downlink scheduling assignments.

Uplink scheduling grants, including Physical Uplink Shared Channel (PUSCH) resource indication, transport format, and hybrid-ARQ-related information. An uplink scheduling grant also includes a command for power control of the PUSCH.

Power-control commands for a set of terminals as a complement to the commands included in the scheduling assignments/grants.

One PDCCH/ePDCCH carries one DCI message containing one of the groups of information listed above. As multiple terminals can be scheduled simultaneously, and each terminal can be scheduled on both downlink and uplink simultaneously, there must be a possibility to transmit multiple scheduling messages within each subframe. Each scheduling message is transmitted on separate PDCCH/ePDCCH resources, and consequently there are typically multiple simultaneous PDCCH/ePDCCH transmissions within each subframe in each cell. Furthermore, to support different radio-channel conditions, link adaptation can be used, where the code rate of the PDCCH/ePDCCH is selected by adapting the resource usage for the PDCCH/ePDCCH, to match the radio-channel conditions.

There is a start symbol for PDSCH and ePDCCH within the subframe. The OFDM symbols in the first slot are numbered from 0 to 6. For transmissions modes 1-9, the starting OFDM symbol in the first slot of the subframe for ePDCCH can be configured by higher layer signaling and the same is used for the corresponding scheduled PDSCH. Both sets have the same ePDCCH starting symbol for these transmission modes. If not configured by higher layers, the start symbol for both PDSCH and ePDCCH is given by the Control Format Indicator (CFI) value signaled in the Physical Control Format Indicator Channel (PCFICH).

LTE Measurements

A UE performs periodic cell search and Reference Signal Received Power (RSRP) and Reference Signal Received Quality (RSRQ) measurements in Radio Resource Control (RRC) Connected mode. It is responsible for detecting new neighbor cells, and for tracking and monitoring already detected cells. The detected cells and the associated measurement values are reported to the network. Reports to the network can be configured to be periodic or aperiodic based on a particular event.

License Assisted Access

Up to now, the spectrum used by LTE is dedicated to LTE. This has the advantage that LTE system does not need to care about the coexistence issue and the spectrum efficiency can be maximized. However, the spectrum allocated to LTE is limited which cannot meet the ever increasing demand for larger throughput from applications/services. Unlicensed spectrum can, by definition, be simultaneously used by multiple different technologies. Therefore, LTE should consider the coexistence issue with other systems such as IEEE 802.11 Wireless Local Area Network (WLAN) standard. This standard is also known under its marketing brand "Wi-Fi." Operating LTE in the same manner in unlicensed spectrum as in licensed spectrum can seriously degrade the performance of WLAN/Wi-Fi devices as a WLAN/Wi-Fi device will not transmit once it detects the channel is occupied.

3GPP License Assisted Access (LAA) intends to allow LTE equipment to also operate in the unlicensed radio spectrum such as the 5 GHz band. The unlicensed spectrum is used as a complement to the licensed spectrum. One way to utilize the unlicensed spectrum reliably is to transmit essential control signals and channels on a licensed carrier. Accordingly, devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell. An example is when a UE is connected to a PCell in the licensed band and one or more SCells in the unlicensed band. The secondary cell in unlicensed spectrum is referred to as a license assisted secondary cell (LA SCell).

Regulatory requirements, however, may not permit transmissions in the unlicensed spectrum without prior channel sensing. Since the unlicensed spectrum must be shared with other radios of similar or dissimilar wireless technologies, a listen-before-talk (LBT) access method needs to be applied. Today, the unlicensed 5 GHz spectrum is mainly used by equipment implementing the IEEE 802.11 WLAN standard.

The use of the LBT procedure leads to uncertainty at the eNB regarding whether it will be able to transmit a downlink subframe(s) or not, at any given time. This leads to a corresponding uncertainty at the UE as to if it actually has a subframe to decode or not. An analogous uncertainty exists in the uplink direction where the eNB is uncertain if the UEs scheduled on the SCell actually transmitted or not.

In typical deployments of WLAN, carrier-sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle. When the coverage areas of several access points (APs) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded.

Before a transmission burst on the LAA SCell, the device/equipment employing LBT, performs a Clear Channel Assessment (CCA) check using "energy detect". The device/equipment observes a Operating Channel(s) for defer period and a random number of observation slots. If the channel is found to be idle during these periods, the device can transmit for duration up to a transmission opportunity (TXOP). The purpose of the defer period is to avoid colliding with WLAN acknowledgement (ACK) frame transmissions (without LBT) following a WLAN data frame burst. The random number of idle observation slots is designed to randomize the start of transmissions from different nodes that want to access the channel at the same time.

Standalone operation in unlicensed spectrum using LTE

In addition to LAA operation, it should be possible to run LTE fully on the unlicensed band without the support from the licensed band. This is called LTE-Unlicensed (LTE-U) Stand Alone. An industry alliance (MuLTEfire Alliance or MFA) develops specifications for Standalone LTE-U operations to operate LTE in unlicensed spectrum without the aid of a licensed carrier. In Standalone operations, the PCell will also operate on the unlicensed carrier and thus essential control signals and channels will also be potentially subject to interference and LBT. New aspects compared to licensed spectrum are for example: PCell is on an unlicensed band and the UE is required to initiate, establish, maintain connection with the PCell; mobility management must work in an unsynchronized unplanned network; and mobility manangement must work in an environment with dynamic neighbor relations. Further the carrier (re)selection process (when the network node changes its carrier frequency during operation) becomes more problematic when it is also applied to the PCell (or serving cell in IDLE mode), because then there is no cell that the UE is "anchored" to during the carrier frequency change.

LAA Discovery Reference Signal (DRS)

The discovery reference signals or discovery signals in a DRS occasion comprise the primary synchronization signal (PSS), secondary synchronization signal (SSS), CRS and when configured, also the channel state information reference signals (CSI-RS). The PSS and SSS are used for coarse synchronization, when needed, and for cell identification. The CRS is used for fine time and frequency estimation and tracking and may also be used for cell validation, i.e., to confirm the cell identity (ID) detected from the PSS and SSS. The CSI-RS is another signal that can be used in dense deployments for cell or transmission point identification.

The DRS occasion corresponding to transmissions from a particular cell has a duration of one subframe with the last two symbols removed The discovery signals should be useable by the UE for performing cell identification, RSRP and RSRQ measurements. The RSRP measurement definition based on discovery signals is the same as in prior releases of LTE. The Received Signal Strength Indicator (RSSI) measurement is defined as an average over all OFDM symbols in the downlink parts of the measured subframes within a DRS occasion.

When a UE is being served on multiple carrier frequencies via a PCell and one or more SCells, the UE needs to perform radio resource management (RRM) measurements on other cells on the currently used carrier frequencies (intra-frequency measurements) as well as on cells on other carrier frequencies (inter-frequency measurements). Since the discovery signals are not transmitted continuously, the UE needs to be informed about the timing of the discovery signals so as to manage its search complexity. Furthermore, when a UE is being served on as many carrier frequencies as it is capable of supporting and inter-frequency RRM measurements need to be performed on a different carrier frequency that is not currently being used, the UE is assigned a measurement gap pattern. This gap pattern on a serving frequency allows the UE to retune its receiver for that frequency to the other frequency on which measurements are being performed. During this gap duration, the UE cannot be scheduled by the eNB on the current serving frequency. Knowledge of the timing of the discovery signals is especially important when the use of such measurement gaps is needed. Beyond mitigating UE complexity, this also ensures that the UE is not unavailable for scheduling for prolonged periods of time on the current serving frequencies (PCell or SCell).

The provision of such timing information is done via a discovery measurement timing configuration (DMTC) that is signaled to the UE. The DMTC provides a window with a duration of 6 ms occurring with a certain periodicity and timing within which the UE may expect to receive discovery signals. The duration of 6 ms is the same as the measurement gap duration as defined currently in 3GPP LTE and allows the measurement procedures at the UE for discovery signals to be harmonized regardless of the need for measurement gaps. Only one DMTC is provided per carrier frequency including the current serving frequencies. The UE can expect that the network will transmit discovery signals so that all cells that are intended to be discoverable on a carrier frequency transmit discovery signals within the DMTCs. Furthermore, when measurement gaps are needed, it is expected that the network will ensure sufficient overlap between the configured DMTCs and measurement gaps.

Radio Link Monitoring (RLM)

When a UE is connected to a wireless network, if radio link conditions between the UE and its serving cell deteriorate beyond a certain point then the UE determines that a Radio Link Failure (RLF) has occurred. This could occur in a situation when the UE enters a fading dip, for example, or if a handover was needed but the handover fails for one reason or another. RLF triggers certain actions by the UE, such as the initiation of a radio resource control (RRC) re-establishment procedure. The UE is configured by the network (e.g., via RRC signaling) with one or more parameters that control the RLF triggering conditions for the UE. For LTE systems, these are described in section 5.3.11 of 3GPP Technical specification (TS) 36.331.

The quality of the radio link is monitored in the UE, on the physical layer (Layer 1), as described in the most recent versions of 3GPP TS 36.300, 3GPP TS 36.331, and 3GPP TS 36.133, and as summarized below. Note that in this disclosure, "layer" refers to a protocol layer as implemented by a processing circuit executing appropriate firmware and/or software. Thus, a typical UE may comprise one or more processing circuits executing a protocol stack, such that the UE may be regarded as comprising several "layers," including the physical layer (Layer 1, L1), a data link layer (Layer 2, L2), a network layer (Layer 3, L3), etc.

When the UE is in RRC_CONNECTED state and upon detecting that the physical layer is experiencing reception problems with respect to receiving signals from the primary cell (PCell), e.g., according to criteria defined in 3GPP TS 36.133, the physical layer sends, to the RRC protocol layer, an indication of the detected problems. This indication is referred to as an "out-of-sync" indication. After a configurable number N310 of such consecutive out-of-sync indications, a timer T310 is started. If the physical layer subsequently generates N311 consecutive "in-sync" indications for the PCell while T310 is running, then the RRC layer will stop timer T310. On the other hand, if the link quality is not improved (recovered) while timer T310 is running, i.e., if there are not N311 consecutive "in-sync" indications from the physical layer, a RLF is declared in the user equipment when the timer T310 expires. This sequence of events is shown in FIG. 1. The functions of the currently relevant timers and counters described above are listed in Table 1, for reference.

TABLE 1

| Timer | Start | Stop | At expiry |
|---|---|---|---|
| T310 | Upon detecting physical layer problems, i.e. upon receiving N310 consecutive out-of-sync indications from lower layers | Upon receiving N311 consecutive in-sync indications from lower layers, upon triggering the handover procedure and upon initiating the connection re-establishment procedure | If security is not activated: go to RRC_IDLE else: initiate the connection re-establishment procedure |
| T311 | Upon initiating the RRC connection re-establishment procedure | Selection of a suitable E-UTRA cell or a cell using another RAT | Enter RRC_IDLE |

| Constant | Usage |
|---|---|
| N310 | Maximum number of consecutive "out-of-sync" indications received from lower layers |
| N311 | Maximum number of consecutive "in-sync" indications received from lower layers |

The UE may read the timer values and counter constants shown in Table 1 from system information broadcasted in the cell. Alternatively, it is possible to configure the UE with UE-specific values of the timers and counter constants using dedicated signaling, i.e., where specific values and constants are given to a particular UE or group of UEs with messages directed only to that UE or group of UEs.

If timer T310 expires, indicating that an RLF has occurred, then the UE initiates a connection re-establishment to recover the ongoing RRC connection. This procedure includes cell selection by the user equipment. That is, the RRC_CONNECTED UE shall autonomously try to find a better cell to connect to, since the connection to the previous cell failed according to the described measurements. It could occur that the UE returns to the first cell anyway, but the same procedure is executed in any event. Once a suitable cell is selected as further described, e.g., in 3GPP TS 36.304, the UE requests a re-establishment of the connection in the selected cell. It is important to note the difference in mobility behavior when an RLF results in UE-based cell selection, in contrast to the normally applied network-controlled mobility.

If the re-establishment is successful, which depends on, among other things, whether the eNB controlling the selected cell is prepared to maintain the connection to the UE, which implies that it is prepared to accept the re-establishment request, then the connection between the UE and the network can resume, through the newly selected eNB (or the re-selected eNB, if the connection is re-established to the same eNB). In LTE, a re-establishment procedure includes a random-access request in the selected cell, followed by higher layer signaling where the user equipment sends a message with content that be used to identify and authenticate the UE. This is needed so that the network can trust that it knows exactly which UE is attempting to perform the re-establishment.

If the re-establishment attempt fails, the UE goes to RRC_IDLE state and the connection is released. To continue communication, a new RRC connection must then be requested and established. A re-establishment failure could occur, for example, if the eNB that receives the re-establishment request is unable to identify the UE that requests the re-establishment. Such a condition may occur if the receiving eNB has not been informed or otherwise prepared for a possible re-establishment from this UE.

The reason for introducing the timers T31$x$ and counters N31$x$ described above is to add some freedom and hysteresis for configuring the criteria for when a radio link should be considered as failed and needing to be re-established. This flexibility is desirable, since it would affect the end-user performance negatively if a connection is abandoned prematurely if it turned out that the loss of link quality was temporary and the UE succeeded in recovering the connection without any further actions or procedures, e.g., before T310 expires or before the counter reaches value N310.

In LTE networks, the radio link is monitored by the UE using Qin and Qout status, as specified by the 3GPP. Details may be found in chapter 4.2.1 of the 3GPP document 3GPP TS 36.213, v. 10.10.0 (June 2013) and chapter 7.6 of the 3GPP document 3GPP TS 36.133, v10.12.0 (September 2013), both of which documents are available at 3gpp.org.

The UE estimates the downlink radio link quality and compares it to the thresholds Qout and Qin for the purpose of monitoring downlink radio link quality of the primary cell (PCell) and determining "in-sync" and "out-of-sync" conditions. The threshold Qout is defined as the level at which the downlink radio link cannot be reliably received, and corresponds to a 10% block-error rate of a hypothetical PDCCH transmission, taking into account errors on the PCFICH. The threshold Qin is defined as the level at which the downlink radio link quality can be significantly more reliably received than at Qout, and corresponds to a 2% block-error rate of a hypothetical PDCCH transmission, taking into account PCFICH errors. Thus, the UE is considered "in-sync" when the monitored radio link quality is better than Qin, and is "out-of-sync" when the monitored radio link quality is worse than Qout.

Rel-13 LTE RLM is time-based and counter-based. In non-discontinuous reception (non-DRX), L1 out-of-sync and in-sync evaluation period is based on 200 ms and 100 ms of downlink subframes respectively. In DRX, Layer 1 (L1) out-of-sync and in-sync evaluation period is based on a number of DRX cycles. Layer 3 (L3) counters are based on receiving consecutive L1 synchronization (sync) events.

The UE shall monitor the downlink link quality based on the cell-specific reference signal in order to detect the downlink radio link quality of the PCell and PSCell. The UE shall estimate the downlink radio link quality and compare it to the thresholds Qout and Qin for the purpose of monitoring downlink radio link quality of the PCell and PSCell. The CRS signals have a constant transmit power and hence provide the UE with a reliable input for its sync evaluation algorithm.

SUMMARY

According to one aspect, a method, in a wireless device, for monitoring radio link quality for a link between the wireless device and a wireless transmitter in a wireless system in which the wireless transmitter is configured to transmit a discovery signal at spaced, periodic, intervals and is further configured to intermittently transmit subframes carrying user data, such that the wireless device is unable to predict which subframes will carry user data before attempting to detect the subframes. The method includes collecting, for each of the spaced, periodic, intervals, one or more discovery-signal signal quality metrics corresponding to the discovery signal. The method also includes collecting, for each detected subframe carrying user data, one or more detected-subframe signal quality metrics corresponding to the detected subframe. The method further includes generating, for each of a plurality of evaluation intervals, an in-synch or out-of-synch indication, based on a combination of the discovery-signal signal quality metrics corresponding to the evaluation interval and the detected-subframe signal quality metrics corresponding to the evaluation interval.

Other aspects include an apparatus, wireless devices, computer program products, computer readable medium and functional module implementations that carry out the method described above.

Using a combination of periodic and aperiodic signals for synchronization evaluation, allows both lightly and heavily loaded use cases to be better covered than if only periodic or aperiodic signals were used. A further advantage is that it reduces implementation and testing efforts and cost. Also, signaling of CRS power variations helps the UE to perform more reliable RLM measurements.

DETAILED DESCRIPTION

Radio link monitoring by the UE in LTE is dependent on receiving a steady input of subframes on which to apply the radio link quality criteria. The stand-alone LTE-U eNBs, which have to coexist with other radio technologies, are required to perform LBT and have limits on the continuous transmissions that are allowed. This poses challenges to the UE for evaluating the radio link quality.

In licensed spectrum, counting subframes in a fixed period of time works well since there is a clear relationship between received subframes and time. In stand-alone LTE-U, there may not be enough subframes transmitted by the eNB for the UE to adequately perform RLM if a fixed time period is used. Instead, it is proposed in MulteFire standardization that RLM evaluation is only based on subframes that were detected by the UE. That is, the UE counts detected subframes and then evaluates the RLM criteria once a certain number of subframes have been detected. Because the data transmissions are intermittent, there is no clear relationship between counting data subframes and time so if the UE loses its connection with the network because the eNB fails to transmit, the UE will not realize it.

Figure 1:
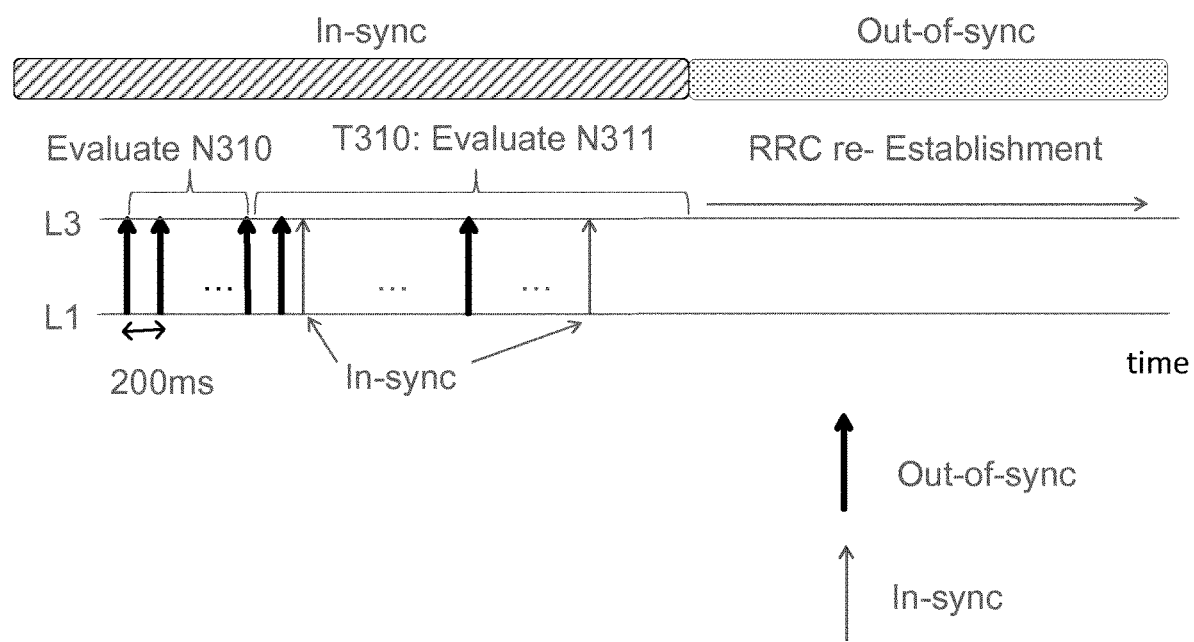
FIG. 1 illustrates radio link failure leading to RRC re-establishment.
Figure 2:
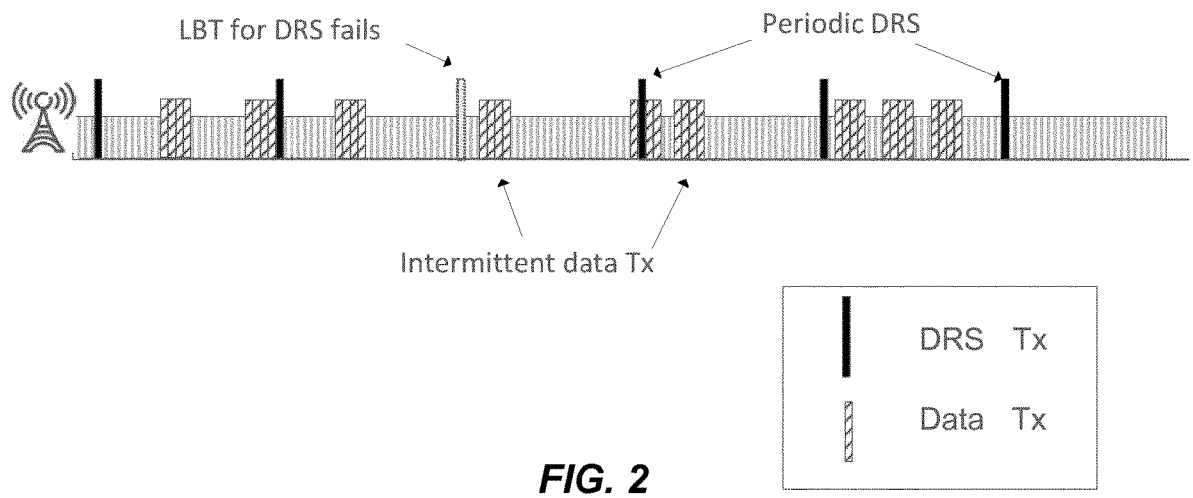
FIG. 2 illustrates sporadic downlink transmissions available for RLM.

The DRS, on the other hand, is transmitted periodically, as illustrated in FIG. 2, even when there is no user data. Thus the UE can determine that the eNB has failed to transmit. However, synchronization (synch) criteria based only on the DRS could result in slow response times in the Layer 1 (L1) sync evaluation due to the sparseness of subframes to evaluate. Only 1 subframe out of 40 subframes can be a DRS, in the most frequent DRS transmission configuration. In the least frequent DRS transmission configuration, only 1 subframe out of 160 subframes can be a DRS.

Figure 3:
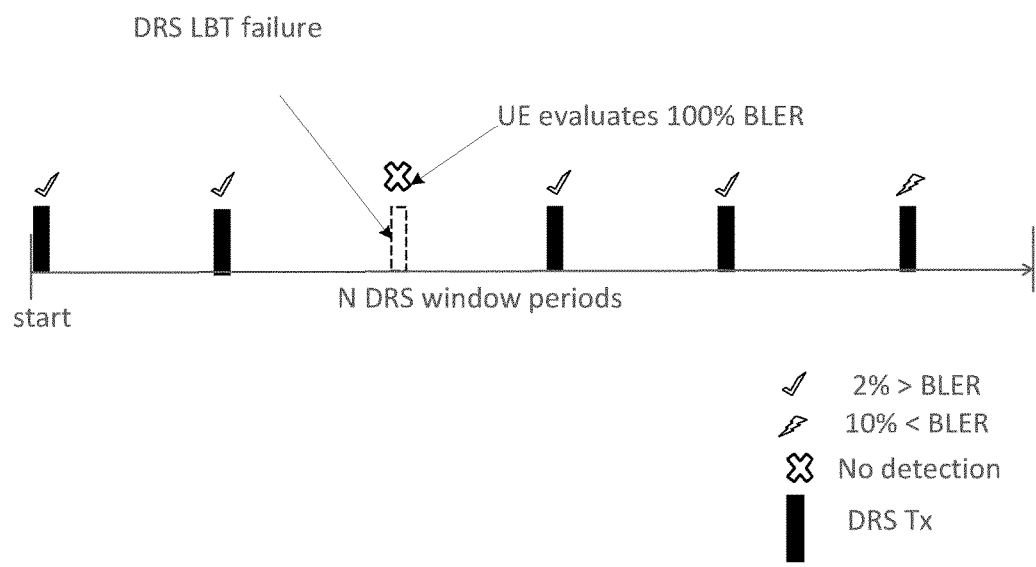
FIG. 3 illustrates radio link monitoring (RLM) based on periodic control signals.
Figure 4:
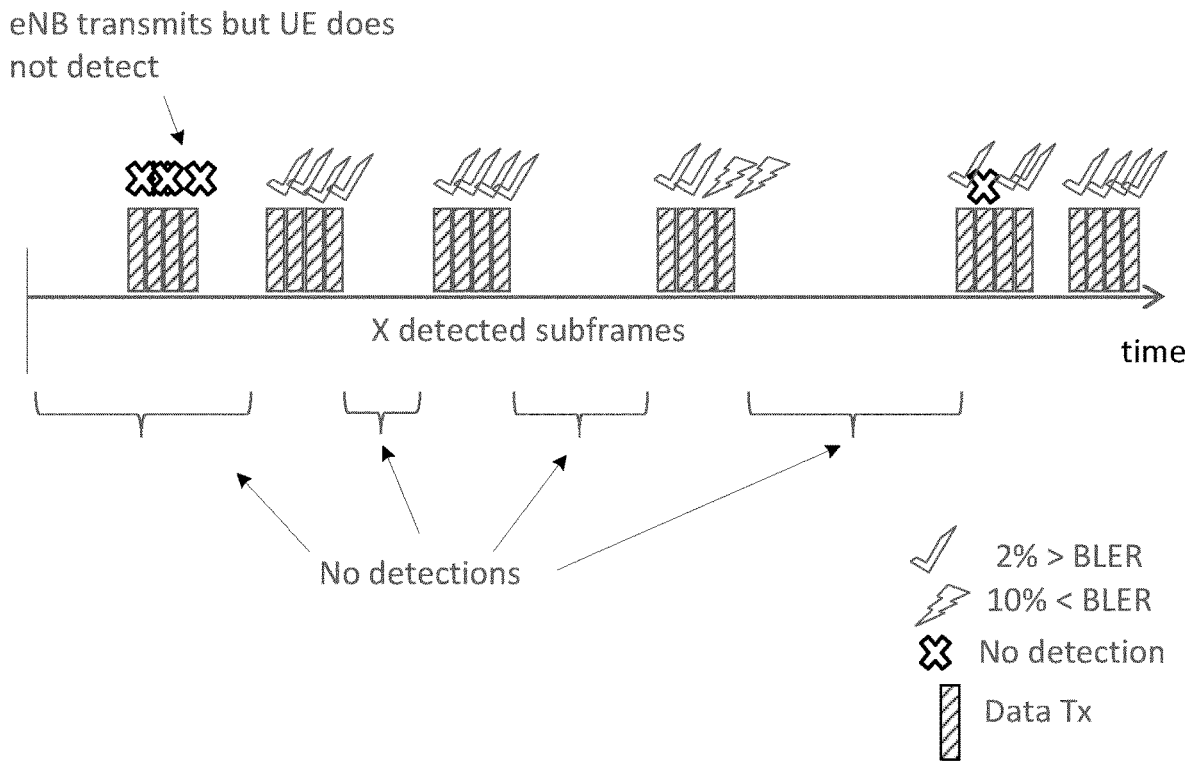
FIG. 4 illustrates RLM based on opportunistic aperiodic data subframes.

FIG. 3 and FIG. 4 show two example methods for performing RLM by the UE.

FIG. 3 shows periodic DRS transmissions occurring within the DRS time window. The radio link quality is evaluated over a fixed and defined period of N DRS windows. At the end of the evaluation period, the average block error rate (BLER) is calculated. In-sync or out-of-sync can be signaled from L1 to L3 within the UE, if the result is below or above a certain threshold.

FIG. 4 shows downlink data transmissions being used for RLM. The radio link quality is evaluated over a fixed number of detected downlink data subframes X. At the end of the evaluation period, the average block error rate (BLER) is calculated. In-sync or out-of-sync can be signaled from L1 to L3 within the UE, if the result is below or above a certain threshold.

However, none of the two methods described above alone completely solves the problem of RLM when transmissions are intermittent and further subject to LBT and thus then the UE or wireless device is unable to know or predict which subframes that carry user data before attempting to detect the subframes.

In Standalone LTE-U, another problem with performing RLM evaluations is that potentially the eNB is allowed to change the transmit power between transmission bursts. The CRS transmit power contained in the DRS subframe is the reference transmit power. An increase in CRS power in another transmission burst not containing the DRS for instance will give a correspondingly lower estimated BLER in those subframes. The overall effect is that the RLM evaluations become less reliable.

Embodiments of the present disclosure combine the use of reliable periodic control signals (DRS) and intermittent data subframes in the UE to evaluate the radio link quality. The way these two methods are combined affects the evaluation period or evaluation interval.

A first method, which is herein denoted as coordinated RLM, is where the N and X RLM evaluation start periods are coordinated. The shortest evaluation period (either N or X) resets the evaluation period for both evaluation criteria, as determined by the thresholds Qin and Qout, respectively. A second method, which is herein denoted as parallel RLM, is where the N and X synchronization evaluations run in parallel and independently. Synchronization indications are sent independently to Layer 3 (L3) and are counted together in L3. The threshold Qin is defined as the level at which the downlink radio link quality can be significantly more reliably received than at Qout, and corresponds to a 2% block-error rate of a hypothetical PDCCH transmission, taking into account PCFICH errors. Thus, the UE is considered "in-sync" when the monitored radio link quality is better than Qin, and is "out-of-sync" when the monitored radio link quality is worse than Qout.

Also, the eNB may signal to the UE whether the eNB changes transmit power between transmission bursts. This indication states if the power is constant across transmission bursts or if the power can differ across transmission bursts. If the transmission power can differ, the possible power offsets with respect to the reference transmission power is indicated.

Using a combination of periodic and aperiodic signals for synchronization evaluation, allows both lightly and heavily loaded use cases to be better covered than if only periodic or aperiodic signals were used. The embodiments in this disclosure describes changes in the physical layer (L1) while the RRC layer (L3) can be reused from LTE. The advantage of this approach is that it reduces implementation and testing efforts and cost. Also, signaling of CRS power variations help the UE to perform more reliable RLM measurements.

Embodiments described herein implement a method in a wireless device or user equipment (UE) for monitoring the radio link quality to determine its synchronization status, using a combination of periodic control signals and intermittent data subframes.

Figure 5:
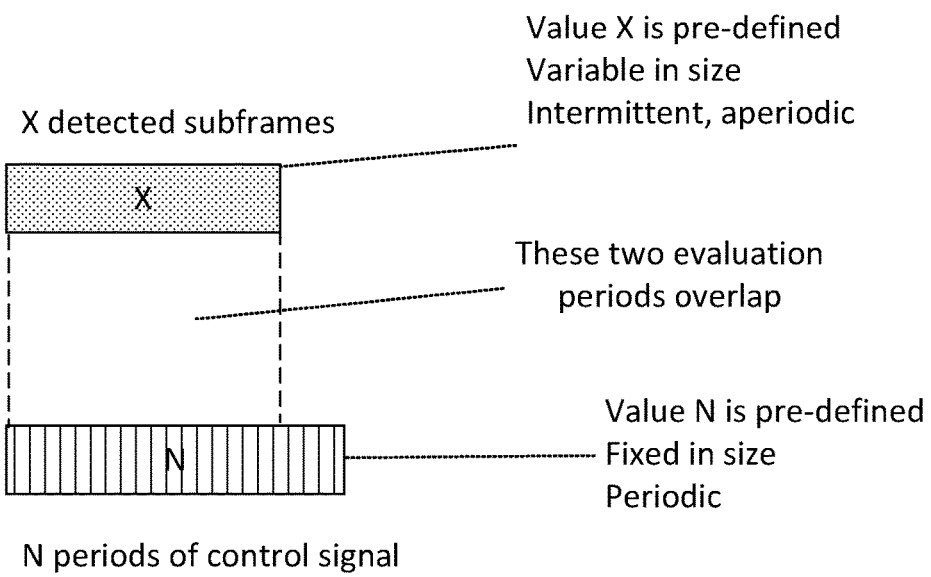
FIG. 5 illustrates an evaluation algorithm and period definitions, according to some embodiments.

In FIG. 5, the evaluation period for L1 to determine in-synch or out-of-sync using the N periodic control signals is defined as well as the evaluation period using the X detected subframes.

Figure 6:
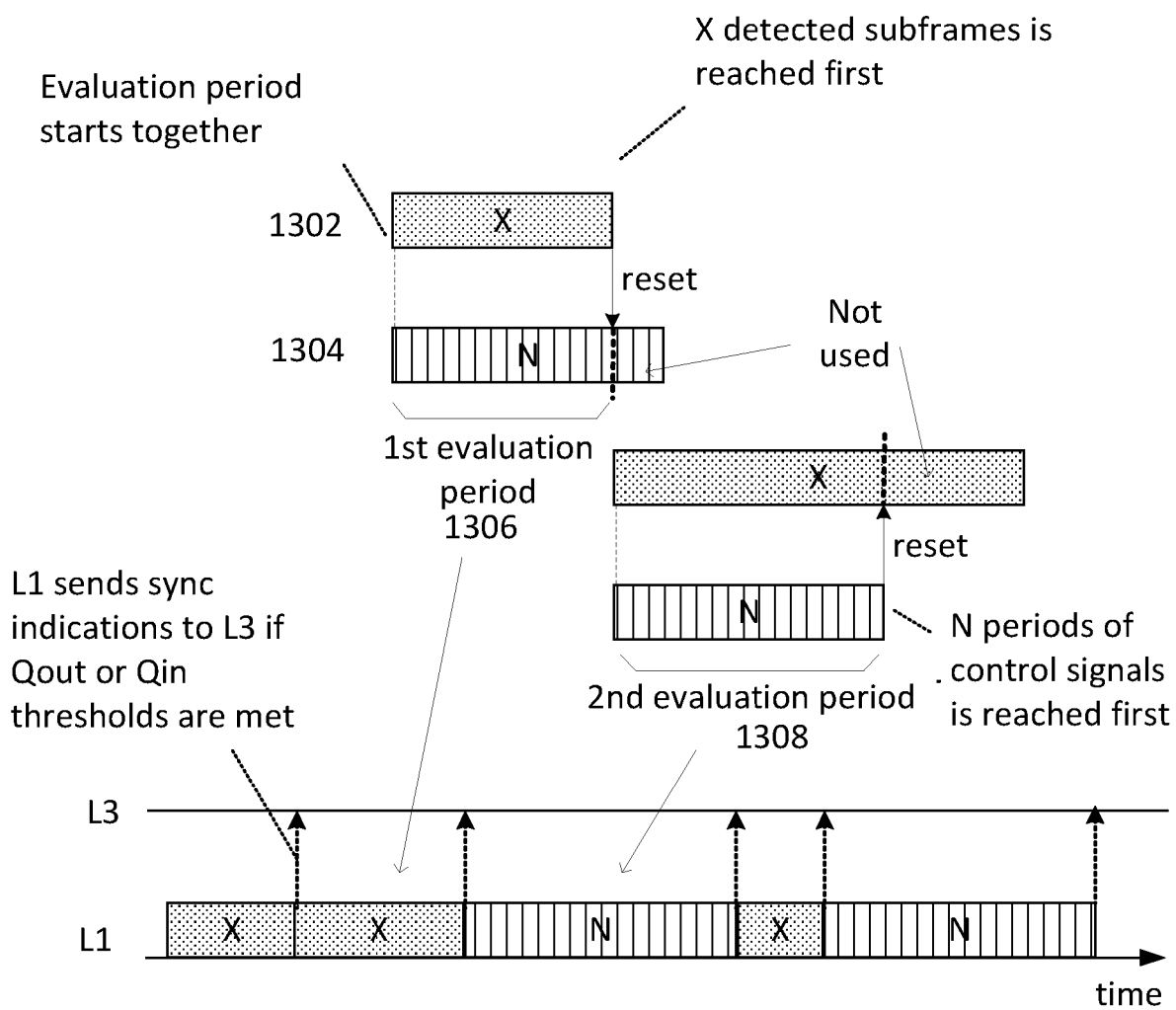
FIG. 6 illustrates a coordinated RLM algorithm, according to some embodiments.

In an embodiment illustrated by FIG. 6, the radio link monitoring algorithms evaluating X detected subframes and N periods of control signals (e.g., CRS in DRS) operate independently. When one evaluation algorithm has fulfilled its criteria of obtaining sufficient new samples for evaluation (a sample can either be a detected subframe or a DRS subframe), a new evaluation period is started for both evaluation algorithms. This constitutes a reset of the other algorithm which has not yet reached the end of its evaluation duration. For example (top of FIG. 6), if a first algorithm 1302 evaluating X detected subframes has obtained a sufficient number of new samples over a first evaluation period 1306, a second algorithm 1304 that operates independently resets. The reset will occur even though not all of the N periods of control signals have been evaluated.

The samples may be used to determine signal quality metrics. These signal quality metrics may involve RSRQ, RSRP and RSSI, as described above. The signal quality metrics may also involve any other measurements or values used to determine signal quality (e.g. signal-to-interference-and-noise-ratio, SINR values) or a presence of a wireless transmitter.

The subframes used for evaluating the X detected subframes are only available if there is downlink data transmission ongoing in the system. The number X is chosen so that the RLM algorithm evaluation X detected subframes can be longer or shorter than N periods of control signals, depending on the availability of downlink data subframes. At the end of the evaluation, the algorithm which reaches the end criteria first may generate an in-sync or out-of-sync indication to higher layers (e.g. from L1 to L3) if the Qin or Qout threshold criterion is met, when samples have been evaluated, respectively.

In the second evaluation period 1308, the second algorithm 1304 reaches the N periods of control signals and resets both algorithms 1302 and 1304, even though, in this case, the first algorithm 1302 has not reached X number of detected subframes.

Figure 7:
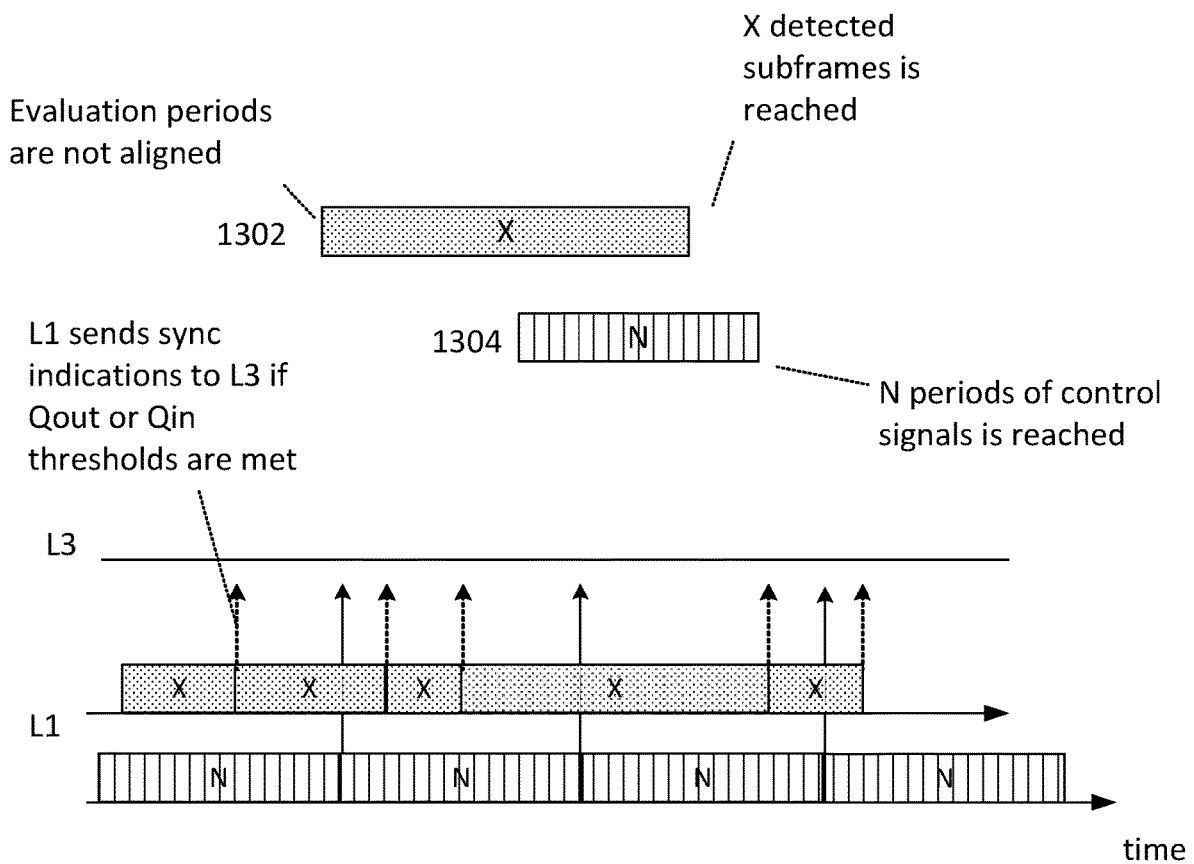
FIG. 7 illustrates a parallel RLM algorithm, according to some embodiments.

In another embodiment illustrated by FIG. 7, the radio link monitoring algorithms 1302, 1304 evaluating X detected subframes and N periods of control signals operate independently. These algorithms 1302, 1304 operate in parallel and do not interact with each other. When each evaluation algorithm 1302, 1304 has fulfilled its criteria of obtaining sufficient samples for evaluation (X newly detected subframes or N periods of control signaling), a new evaluation period is started independently. At the end of the evaluation period, each algorithm may generate an in-sync or out-of-sync indication to higher layers, e.g. L3, if the Qin or Qout criterion is met. From an L3 perspective, there is no distinction between sync indications received from either the X detected subframes algorithm or the N periods of control signaling.

Figure 8:
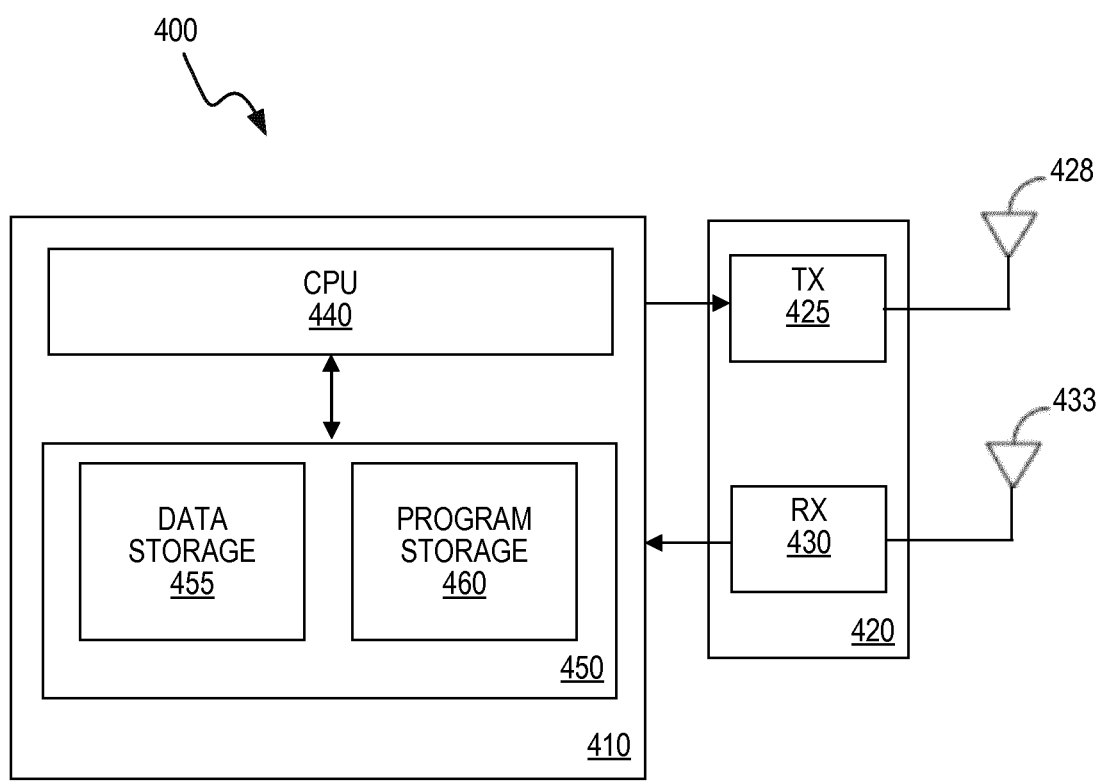
FIG. 8 is a block diagram illustrating components of an example wireless device, according to some embodiments.

FIG. 8 illustrates features of an example wireless device 400, which can be used to implement methods for monitoring the radio link quality for determining its synchronization status, using a combination of periodic control signals and intermittent transmitted data subframes. The combination is made by interacting the periodic control signals and intermittent transmitted data subframes which each other to reset the evaluation interval or allow higher layers (such as layer 3) evaluate synch indications together. In various embodiments, the non-limiting term UE or wireless device is used. In other instances, the terms "communication device," "mobile terminal," or "mobile station" may be used. For purposes of understanding the presently disclosed techniques and apparatus, these terms may be considered to be interchangeable. A UE or communication device described herein can be any type of wireless device capable of communicating with a network node or with another communication device over radio signals. Such a device may also be referred to as a radio communication device or a target device, and such devices may also include any of those devices known as a device-to-device (D2D) UE, a machine-type UE or UE capable of machine-to-machine communication (M2M), a sensor equipped with a UE, a wireless-enabled tablet computing device, a mobile terminal, a smart phone, a laptop embedded equipped (LEE), a laptop-mounted equipment (LME), a USB dongle, a Customer Premises Equipment (CPE), etc.

Various embodiments are described in the context of the LTE radio access network (RAN), as specified by 3GPP. However, it should be understood that the techniques and apparatus may be applicable to any radio access technology (RAT) or multi-RAT system where the UE operates using uplink carrier aggregation.

Wireless device 400, such as a UE configured for operation with an LTE network (E-UTRAN), includes a transceiver unit 420 for communicating with one or more base stations (eNBs) as well as a processing circuit 410 for processing the signals transmitted and received by the transceiver unit 420. Transceiver unit 420 includes a transmitter 425 coupled to one or more transmit antennas 428 and receiver 430 coupled to one or more receiver antennas 433. The same antenna(s) 428 and 433 may be used for both transmission and reception. Receiver 430 and transmitter 425 use known radio processing and signal processing components and techniques, typically according to a particular telecommunications standard such as the 3GPP standards for LTE. Note also that transmitter unit 420 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the techniques described herein, additional details are not shown here.

Processing circuit 410 comprises one or more processors 440 coupled to one or more memory devices 450 that make up a data storage memory 455 and a program storage memory 460. Processor 440, identified as CPU 440 in FIG. 8, may be a microprocessor, microcontroller, or digital signal processor, in some embodiments. More generally, processing circuit 410 may comprise a processor/firmware combination, or specialized digital hardware, or a combination thereof. Memory 450 may comprise one or several types of memory such as read-only memory (ROM), random-access memory, cache memory, flash memory devices, optical storage devices, etc. If wireless device 400 supports multiple radio access technologies, processing circuit 410 may include separate processing resources dedicated to one or several radio access technologies, in some embodiments.

Typical functions of the processing circuit 410 include modulation and coding of transmitted signals and the demodulation and decoding of received signals. In several embodiments, processing circuit 410 is configured, using suitable program code stored in program storage memory 460, for example, to monitor radio link quality for a link between the wireless device 400 and a wireless transmitter in a wireless system in which the wireless transmitter is configured to transmit a discovery signal at spaced, periodic, intervals and is further configured to intermittently transmit subframes carrying user data, such that the wireless device 400 is unable to predict which subframes will carry user data before attempting to detect the subframes. For example, the processing circuit 410 is configured to collect, for each of the spaced, periodic, intervals, one or more discovery-signal signal quality metrics corresponding to the discovery signal. The processing circuit 410 is also configured to collect, for each detected subframe carrying user data, one or more detected-subframe signal quality metrics corresponding to the detected subframe. The processing circuit 410 is also configured to generate, for each of a plurality of evaluation intervals, an in-synch or out-of-synch indication, based on a combination of the discovery-signal signal quality metrics corresponding to the evaluation interval and the detected-subframe signal quality metrics corresponding to the evaluation interval.

Figure 9:
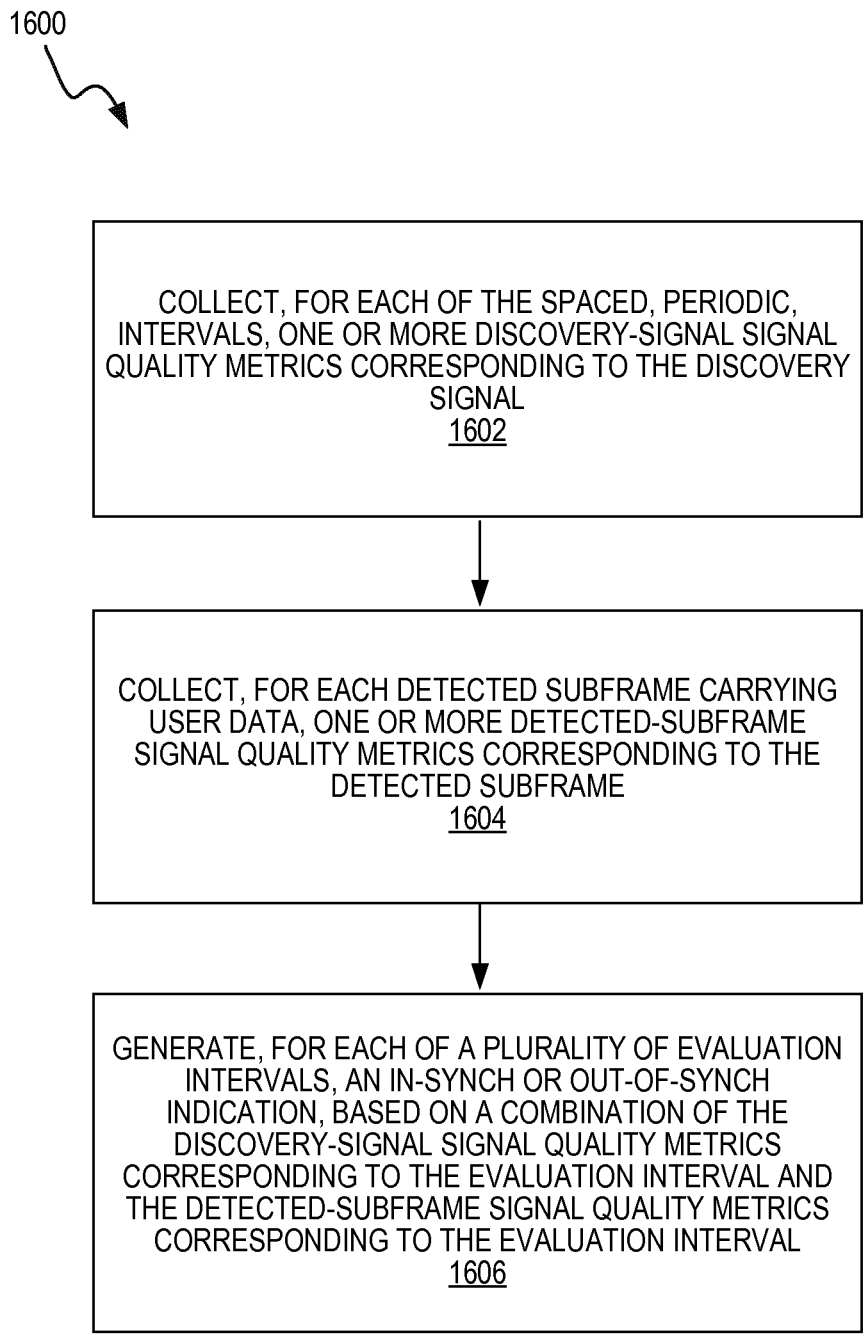
FIG. 9 is a process flow diagram illustrating a method carried out in the wireless device, according to some embodiments.

FIG. 9 illustrates a method 1600 in the wireless device 400 for monitoring radio link quality for a link between the wireless device and a wireless transmitter in a wireless system in which the wireless transmitter is configured to transmit a discovery signal at spaced, periodic, intervals and is further configured to intermittently transmit subframes carrying user data, such that the wireless device is unable to predict which subframes will carry user data before attempting to detect the subframes. The method 1600 includes collecting, for each of the spaced, periodic, intervals, one or more discovery-signal signal quality metrics corresponding to the discovery signal (block 1602). It will be appreciated that these signal quality metrics may comprise power/amplitude measurements on individual reference symbols, or accumulated or average signal power over a number of resource elements or other time-frequency resources, or RSRP, RSSI, RSRQ, or SINR measurements corresponding to one or more resource blocks, to list but a few examples. The method 1600 also includes collecting, for each detected subframe carrying user data, one or more detected-subframe signal quality metrics corresponding to the detected subframe (block 1604). Again, it will be appreciated that these signal quality metrics may comprise power/amplitude measurements on individual reference symbols, or accumulated or average signal power over a number of resource elements or other time-frequency resources, or RSRP, RSSI, RSRQ, or SINR measurements corresponding to one or more resource blocks, to list but a few examples.

The method 1600 further includes generating, for each of a plurality of evaluation intervals, an in-synch or out-of-synch indication, based on a combination of the discovery-signal signal quality metrics corresponding to the evaluation interval and the detected-subframe signal quality metrics corresponding to the evaluation interval (block 1606). The method 1600 may also include evaluating the generated in-synch and out-of-synch indications, according to predetermined radio-link-failure evaluation criteria and performing a connection reestablishment procedure upon determining that the predetermined radio-link-failure evaluation criteria are satisfied.

As discussed above, in some embodiments the evaluations of the signal quality metrics for the discovery signal and the detected user data subframes are carried out independently, but the evaluation interval resets when criterion for either of the two evaluation processes is satisfied. Thus, in some embodiments of the method shown in FIG. 9, the evaluation intervals are consecutive and the generating includes, for each evaluation interval, separately evaluating the discovery-signal signal quality metrics and the detected-subframe signal quality metrics, based on respective evaluation criteria for determinations of in-synch or out-of-synch, until either the evaluating of the discovery-signal signal quality metrics or the evaluating of the detected-subframe signal quality metrics results in an in-synch or out-of-synch determination. This may also include starting a new evaluation interval for evaluating the discovery-signal signal quality metrics and the detected-subframe signal quality metrics, each time an in-synch or out-of-synch determination is made.

In other embodiments, the generating includes separately evaluating the discovery-signal signal quality metrics and the detected-subframe signal quality metrics, based on respective evaluation criteria for determinations of in-synch or out-of-sync, in respective overlapping evaluation intervals, starting a new evaluation interval for evaluating the discovery-signal signal quality metrics each time the evaluating of the discovery-signal signal quality metrics results in an in-synch or out-of-synch determination, and starting a new evaluation interval for evaluating the detected-subframe signal quality metrics each time the evaluating of the detected-subframe signal quality metrics results in an in-synch or out-of-synch determination.

The evaluation criteria for evaluating the discovery-signal signal quality metrics to make an in-synch or out-of-synch determination may require evaluation of the discovery-signal signal quality metrics for a predetermined number N of the spaced, periodic, intervals, and wherein the evaluation criteria for evaluating the detected-subframe signal quality metrics to make an in-synch or out-of-synch determination require evaluation of the detected-subframe signal quality metrics for a predetermined number X of detected subframes.

The method 1600 may also include receiving an indication that a reference signal power has changed, for one or more detected subframes, and wherein said generating comprises taking into account the indication that the reference signal power has changed when evaluating the detected-subframe signal quality metrics. The indication that the reference signal power has changed may include an indication of a power offset applicable to the reference signal power for one or more detected subframes. Evaluating the detected-subframe signal quality metrics may then include adjusting the detected-subframe signal quality metrics for the one or more detected subframes, based on the power offset.

Embodiments of the presently disclosed techniques include the various methods described above, including the methods illustrated in the process flow diagram of FIG. 9, as well as variants thereof. Another embodiment includes a wireless device apparatus configured to carry out one or more of the wireless-device-related methods. In some embodiments of the invention, processing circuits, such as the processing circuits shown in FIG. 8, are configured to carry out one or more of the techniques described in detail above. Likewise, other embodiments may include wireless devices that include one or more of such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

It will be appreciated that the processing circuit 410, as adapted with program code stored in program and data memory 455 and 460, can implement any one or more of the wireless-device-related methods described above using an arrangement of functional "modules," where the modules are computer programs or portions of computer programs executing on the processor circuit 410. Thus, the apparatus 400 can be understood as comprising a radio transceiver circuit 420 configured to communicate with a wireless network and further comprising several functional modules implemented in processing circuitry 410, where each of the functional modules corresponds to one or several of the method steps described in any one or several of the wireless-device-related methods described above.

Figure 10:
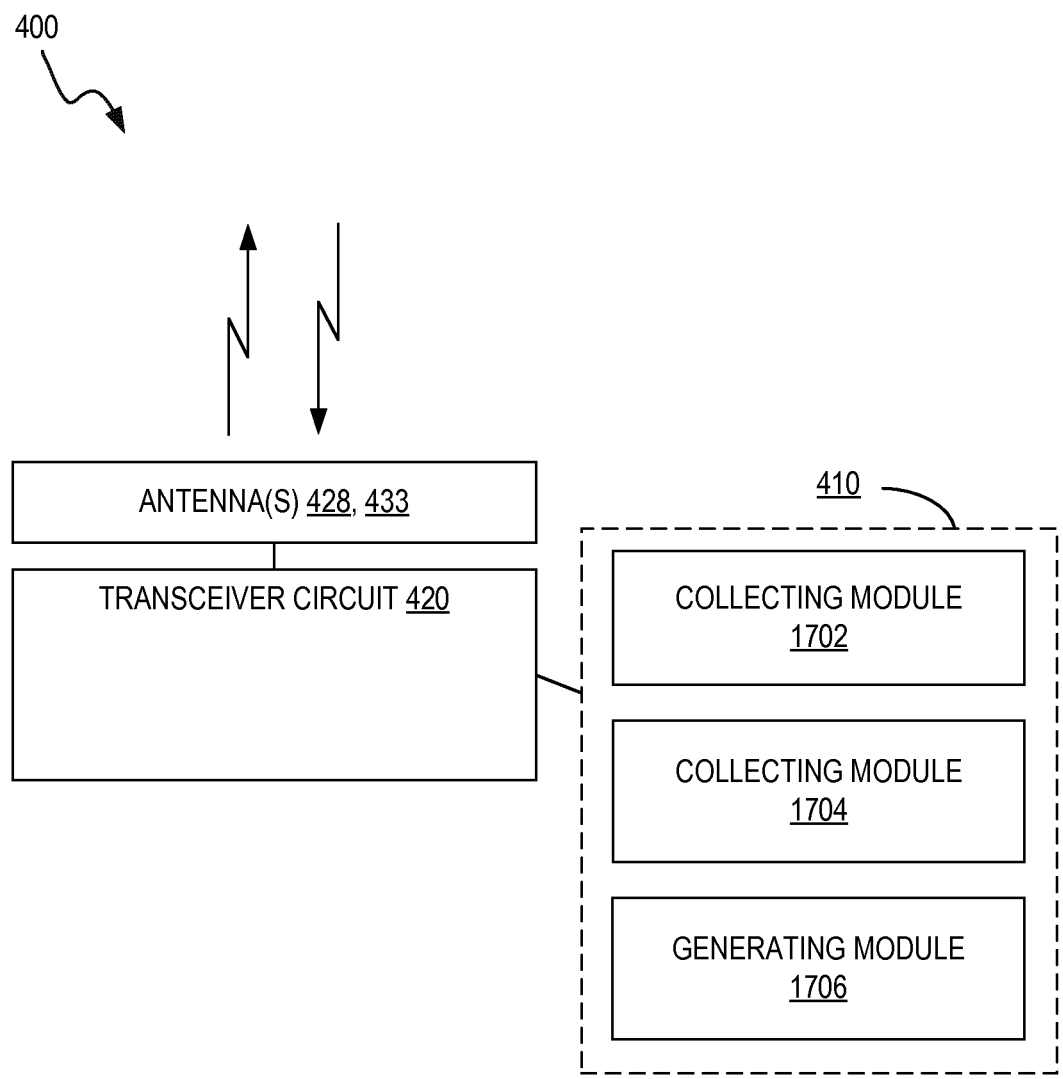
FIG. 10 is an example functional implementation of a wireless device, according to some embodiments.

For example, FIG. 10 illustrates an example functional module or circuit architecture as may be implemented in the wireless device 400, e.g., based on the processing circuitry 410. The illustrated embodiment is for monitoring radio link quality for a link between the wireless device and a wireless transmitter in a wireless system in which the wireless transmitter is configured to transmit a discovery signal at spaced, periodic, intervals and is further configured to intermittently transmit subframes carrying user data, such that the wireless device is unable to predict which subframes will carry user data before attempting to detect the subframes. The implementation at least functionally includes a collecting module 1702 for collecting, for each of the spaced, periodic, intervals, one or more discovery-signal signal quality metrics corresponding to the discovery signal. The functional implementation also includes a collecting module 1704 for collecting, for each detected subframe carrying user data, one or more detected-subframe signal quality metrics corresponding to the detected subframe. The functional implementation further includes a generating module 1706 for generating, for each of a plurality of evaluation intervals, an in-synch or out-of-synch indication, based on a combination of the discovery-signal signal quality metrics corresponding to the evaluation interval and the detected-subframe signal quality metrics corresponding to the evaluation interval.

It will be appreciated by the person of skill in the art that various modifications may be made to the above-described embodiments without departing from the scope of the present invention. For example, although embodiments of the present invention have been described with examples that reference a communication system compliant to the 3GPP-specified LTE or LAA standards, it should be noted that the solutions presented may be equally well applicable to other networks.

Example embodiments have been described herein, with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present concepts may be embodied in hardware and/or in software (including firmware, resident software, micro-code, etc.) running on a processor such as a digital signal processor, which may collectively be referred to as "circuitry," "a module" or variants thereof.

The invention claimed is:

1. A method, in a wireless device, for monitoring radio link quality for a link between the wireless device and a wireless transmitter in a wireless system, in which the wireless transmitter is configured to transmit a discovery signal at spaced, periodic, intervals and is further configured to intermittently transmit subframes carrying user data, such that the wireless device is unable to predict which subframes will carry user data before attempting to detect the subframes, the method comprising:
   collecting, for each of the spaced, periodic, intervals, one or more discovery-signal signal quality metrics corresponding to the discovery signal;
   collecting, for each detected subframe carrying user data, one or more detected-subframe signal quality metrics corresponding to the detected subframe; and
   generating, for each of a plurality of evaluation intervals, an in-synch or out-of-synch indication, based on a combination of the discovery-signal signal quality metrics corresponding to the evaluation interval and the detected-subframe signal quality metrics corresponding to the evaluation interval.

2. The method of claim 1, further comprising:
   evaluating the generated in-synch and out-of-synch indications, according to predetermined radio-link-failure evaluation criteria; and
   performing a connection reestablishment procedure upon determining that the predetermined radio-link-failure evaluation criteria are satisfied.

3. The method of claim 1, wherein the evaluation intervals are consecutive and wherein said generating comprises:
   for each evaluation interval, separately evaluating the discovery-signal signal quality metrics and the detected-subframe signal quality metrics, based on respective evaluation criteria for determinations of in-synch or out-of-synch, until either the evaluating of the discovery-signal signal quality metrics or the evaluating of the detected-subframe signal quality metrics results in an in-synch or out-of-synch determination; and
   starting a new evaluation interval for evaluating the discovery-signal signal quality metrics and the detected-subframe signal quality metrics, each time an in-synch or out-of-synch determination is made.

4. The method of claim 3, wherein the evaluation criteria for evaluating the discovery-signal signal quality metrics to make an in-synch or out-of-synch determination require evaluation of the discovery-signal signal quality metrics for a predetermined number N of the spaced, periodic, intervals, and wherein the evaluation criteria for evaluating the detected-subframe signal quality metrics to make an in-synch or out-of-synch determination require evaluation of the detected-subframe signal quality metrics for a predetermined number X of detected subframes.

5. The method of claim 1, wherein said generating comprises:
- separately evaluating the discovery-signal signal quality metrics and the detected-subframe signal quality metrics, based on respective evaluation criteria for determinations of in-synch or out-of-sync, in respective overlapping evaluation intervals;
- starting a new evaluation interval for evaluating the discovery-signal signal quality metrics each time the evaluating of the discovery-signal signal quality metrics results in an in-synch or out-of-synch determination; and
- starting a new evaluation interval for evaluating the detected-subframe signal quality metrics each time the evaluating of the detected-subframe signal quality metrics results in an in-synch or out-of-synch determination.

6. The method of claim 1, wherein the method further comprises receiving an indication that a reference signal power has changed, for one or more detected subframes, and wherein said generating comprises taking into account the indication that the reference signal power has changed when evaluating the detected-subframe signal quality metrics.

7. The method of claim 6, wherein said indication that the reference signal power has changed includes an indication of a power offset applicable to the reference signal power for one or more detected subframes, and wherein said evaluating the detected-subframe signal quality metrics comprises adjusting the detected-subframe signal quality metrics for the one or more detected subframes, based on the power offset.

8. A wireless device for monitoring radio link quality for a link between the wireless device and a wireless transmitter in a wireless system in which the wireless transmitter is configured to transmit a discovery signal at spaced, periodic, intervals and is further configured to intermittently transmit subframes carrying user data, such that the wireless device is unable to predict which subframes will carry user data before attempting to detect the subframes, the wireless device comprising:
- a radio transceiver circuit configured for communication with a wireless network using carrier aggregation; and
- a processing circuit configured to:
  - collect, for each of the spaced, periodic, intervals, one or more discovery-signal signal quality metrics corresponding to the discovery signal;
  - collect, for each detected subframe carrying user data, one or more detected-subframe signal quality metrics corresponding to the detected subframe; and
  - generate, for each of a plurality of evaluation intervals, an in-synch or out-of-synch indication, based on a combination of the discovery-signal signal quality metrics corresponding to the evaluation interval and the detected-subframe signal quality metrics corresponding to the evaluation interval.

9. The wireless device of claim 8, wherein the processing circuit is further configured to:
- evaluate the generated in-synch and out-of-synch indications, according to predetermined radio-link-failure evaluation criteria; and
- perform a connection reestablishment procedure upon determining that the predetermined radio-link-failure evaluation criteria are satisfied.

10. The wireless device of claim 8, wherein the evaluation intervals are consecutive and wherein the processing circuit is further configured to generate the in-synch or out-of-synch indication by:
- for each evaluation interval, separately evaluating the discovery-signal signal quality metrics and the detected-subframe signal quality metrics, based on respective evaluation criteria for determinations of in-synch or out-of-synch, until either the evaluating of the discovery-signal signal quality metrics or the evaluating of the detected-subframe signal quality metrics results in an in-synch or out-of-synch determination; and
- starting a new evaluation interval for evaluating the discovery-signal signal quality metrics and the detected-subframe signal quality metrics, each time an in-synch or out-of-synch determination is made.

11. The wireless device of claim 10, wherein evaluating the discovery-signal signal quality metrics to make an in-synch or out-of-synch determination comprises evaluation of the discovery-signal signal quality metrics for a predetermined number N of the spaced, periodic, intervals, and wherein evaluating the detected-subframe signal quality metrics to make an in-synch or out-of-synch determination comprises evaluation of the detected-subframe signal quality metrics for a predetermined number X of detected subframes.

12. The wireless device of claim 8, wherein the processing circuit is further configured to generate the in-synch or out-of-synch indication by:
- separately evaluating the discovery-signal signal quality metrics and the detected-subframe signal quality metrics, based on respective evaluation criteria for determinations of in-synch or out-of-sync, in respective overlapping evaluation intervals;
- starting a new evaluation interval for evaluating the discovery-signal signal quality metrics each time the evaluating of the discovery-signal signal quality metrics results in an in-synch or out-of-synch determination; and
- starting a new evaluation interval for evaluating the detected-subframe signal quality metrics each time the evaluating of the detected-subframe signal quality metrics results in an in-synch or out-of-synch determination.

13. The wireless device of claim 8, wherein the processing circuit is further configured to receive an indication that a reference signal power has changed, for one or more detected subframes, and wherein the processing circuit is configured to generate the in-synch or out-of-synch indication by taking into account the indication that the reference signal power has changed when evaluating the detected-subframe signal quality metrics.

14. The wireless device of claim 13, wherein said indication that the reference signal power has changed includes an indication of a power offset applicable to the reference signal power for one or more detected subframes, and wherein the processing circuit is configured to adjust the detected-subframe signal quality metrics for the one or more detected subframes, based on the power offset, when evaluating the detected-subframe signal quality metrics.

15. A non-transitory computer-readable medium comprising, stored thereupon, a computer program product comprising program instructions that, when executed by a processor in a wireless device, causes the wireless device to:
- collect, for each of a plurality of spaced, periodic, intervals in which a wireless transmitter remote to the wireless device is configured to transmit a discovery signal, one or more discovery-signal signal quality metrics corresponding to the discovery signal;

collect, for each detected subframe carrying user data of a plurality of subframes intermittently transmitted by the wireless transmitter and carrying user data, such that the wireless device is unable to predict which subframes will carry user data before attempting to detect the subframes, one or more detected-subframe signal quality metrics corresponding to the detected subframe; and generate, for each of a plurality of evaluation intervals, an in-synch or out-of-synch indication, based on a combination of the discovery-signal signal quality metrics corresponding to the evaluation interval and the detected-subframe signal quality metrics corresponding to the evaluation interval.

\* \* \* \* \*